(12) United States Patent
Peckham et al.

(10) Patent No.: US 7,648,101 B2
(45) Date of Patent: Jan. 19, 2010

(54) METHOD AND APPARATUS FOR FAST DEPLOYING AND RETRIEVING OF TOWED BODIES

(75) Inventors: Christopher M. Peckham, Nashua, NH (US); Thomas E. Gay, Milford, NH (US); Keith Lepine, Manchester, NH (US); John A. Zahoruiko, North Andover, MA (US); John J. Devlin, Weare, NH (US); Scott Colby, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 8 days.

(21) Appl. No.: 12/009,916

(22) Filed: Jan. 23, 2008

(65) Prior Publication Data

US 2008/0245203 A1 Oct. 9, 2008

Related U.S. Application Data

(62) Division of application No. 11/029,580, filed on Jan. 5, 2005, now Pat. No. 7,429,016, which is a division of application No. 10/671,845, filed on Sep. 25, 2003, now Pat. No. 6,886,773.

(60) Provisional application No. 60/418,520, filed on Oct. 15, 2002.

(51) Int. Cl.
*B64C 1/00* (2006.01)
(52) U.S. Cl. .................. 244/1 TD; 244/129.1; 89/1.14; 30/134; 30/135; 30/180; 30/187

(58) Field of Classification Search .................. 30/134, 30/135, 123.3, 175, 180, 186, 187; 244/158.2, 244/1 TD, 129.1; 89/1.14
See application file for complete search history.

(56) References Cited

U.S. PATENT DOCUMENTS

| 3,747,873 | A |   | 7/1973  | Layer et al.           |
|-----------|---|---|---------|------------------------|
| 3,987,746 | A |   | 10/1976 | McCulloh               |
| 4,496,159 | A |   | 1/1985  | Dugan et al.           |
| 4,808,999 | A |   | 2/1989  | Toman                  |
| 4,978,086 | A |   | 12/1990 | Spicer                 |
| 4,979,307 | A | * | 12/1990 | Ste. Marie ...... 30/388 |
| 5,014,997 | A |   | 5/1991  | Smith et al.           |
| 5,020,742 | A |   | 6/1991  | Haslim                 |
| 5,029,773 | A |   | 7/1991  | Lecat                  |
| 5,094,405 | A |   | 3/1992  | Brum                   |
| 5,102,063 | A |   | 4/1992  | Brum                   |

(Continued)

*Primary Examiner*—J. Woodrow Eldred
(74) *Attorney, Agent, or Firm*—Sand & Sebolt; Michael Sand; Daniel J. Long

(57) ABSTRACT

In a method and apparatus for controlling the deployment of a towline connecting a mooring craft to an ejected object comprising the steps of monitoring velocity to determine when a point for optimum braking has been achieved and then engaging a brake system to retard deployment of the towline, a DC motor augments and controls the brake system. The DC motor further controls the retrieval of the object. A cutter mechanism uses a first blade to grip the towing cable to maintain tension thereon as a second blade cuts the cable. A spring biased boom in combination with spring biased fins on the ejected object rapidly deploys the object from its storage housing. A locking mechanism secures the deployment mechanism in a stable locked position upon the object reaching its fully extended position.

9 Claims, 13 Drawing Sheets

U.S. PATENT DOCUMENTS

| | | |
|---|---|---|
| 5,136,295 A | 8/1992 | Bull et al. |
| 5,177,317 A | 1/1993 | Walker et al. |
| 5,333,814 A | 8/1994 | Wallis |
| 5,501,411 A | 3/1996 | Brum et al. |
| 5,570,854 A | 11/1996 | Brum et al. |
| 5,603,470 A | 2/1997 | Fitzgerald et al. |
| 5,605,306 A | 2/1997 | Fitzgerald et al. |
| 5,836,535 A | 11/1998 | Brum |
| 5,987,754 A * | 11/1999 | Hirabayashi et al. .......... 30/228 |
| 6,056,236 A | 5/2000 | Weimer et al. |
| 6,672,543 B2 | 1/2004 | Carlson et al. |
| 6,683,555 B2 | 1/2004 | Carlson et al. |
| 6,779,796 B2 | 8/2004 | Carlson et al. |
| 6,886,773 B2 | 5/2005 | Peckham et al. |
| 7,191,525 B2 * | 3/2007 | Brailovskiy .................. 30/189 |

\* cited by examiner

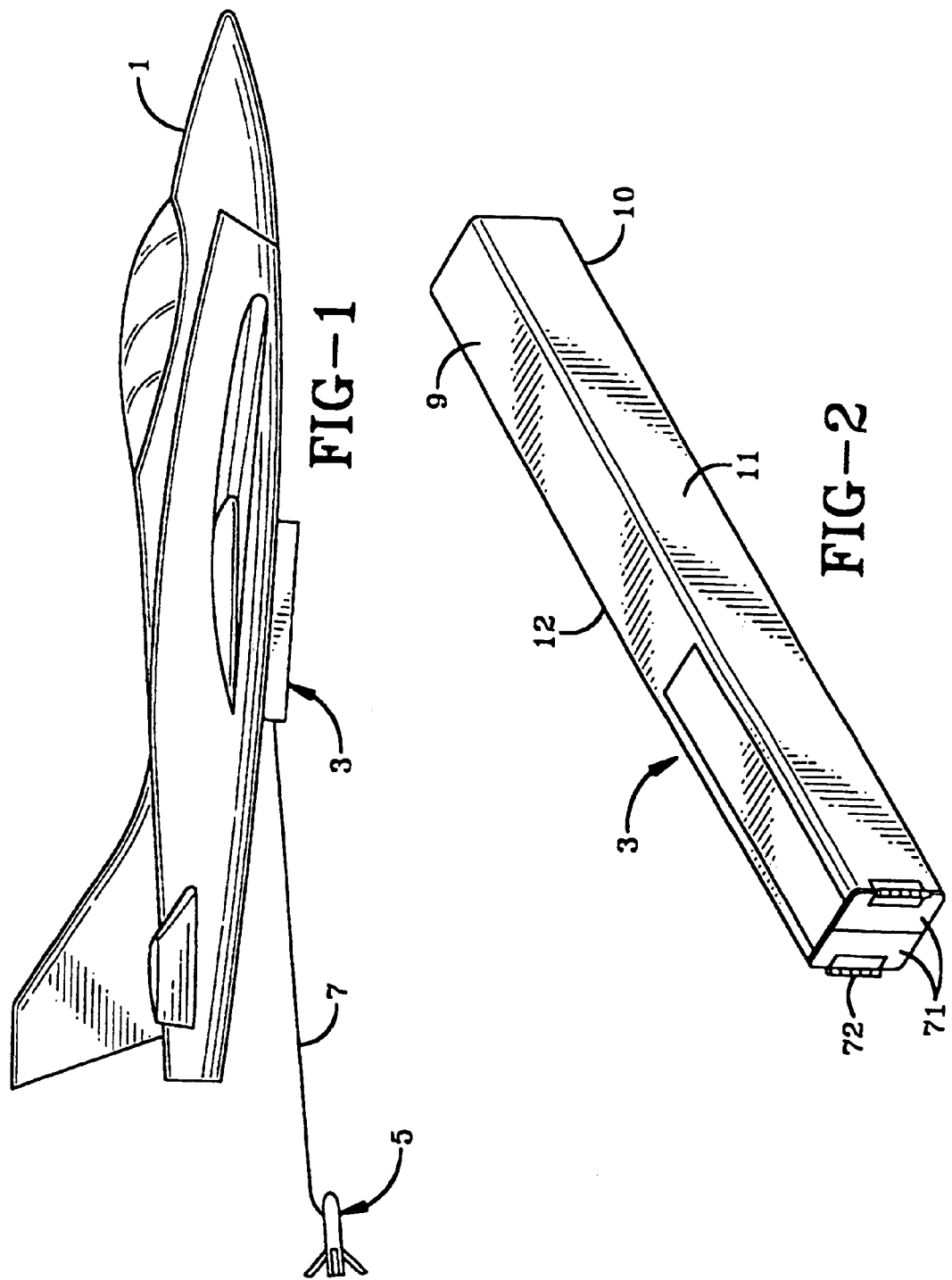

| FIG-5A | FIG-5B | FIG-5C |

# METHOD AND APPARATUS FOR FAST DEPLOYING AND RETRIEVING OF TOWED BODIES

CROSS REFERENCE TO RELATED APPLICATIONS

This application is a divisional application of Ser. No. 11/029,580, filed Jan. 5, 2005, which application is a divisional application of Ser. No. 10/671,845 filed Sep. 25, 2003, now U.S. Pat. No. 6,886,773, which is a standard patent application claiming the benefit of Provisional Patent Application Ser. No. 60/418,520, filed Oct. 15, 2002, the contents of which are incorporated herein by reference.

This application also relates to U.S. application Ser. No. 10/027,325 filed Dec. 20, 2001, now U.S. Pat. No. 6,779,796; U.S. application Ser. No. 10/027,352 filed Dec. 20, 2001, now U.S. Pat. No. 6,672,543; and U.S. application Ser. No. 10/105,716 filed Mar. 25, 2002, now U.S. Pat. No. 6,683,555.

BACKGROUND OF THE INVENTION

1. Technical Field

The present invention relates to aeronautics and more particularly to trailing devices used on aircraft. Even more particularly, the invention relates to a system and apparatus in which a decoy stored on the aircraft is rapidly deployed for protecting the aircraft and is subsequently retrievable back into the aircraft, ready for subsequent deployment.

2. Background Information

Aerial towed objects are used for a variety of purposes, including decoys, testing, and scientific investigations. In one embodiment, a towed decoy is used to draw various types of guided weapons, such as missiles, away from an aircraft that the weapons are intended to destroy. These towed targets and decoys contain various types of electronic circuits to create an apparent target to a weapon which attracts the weapon to the decoy rather than the aircraft. These types of decoys include devices which counter infrared guided and radar guided missiles that pose the primary threats to military aircraft engaged in a combat environment. It will be appreciated that these missiles use their radar guidance systems to get within striking distance of the aircraft, thereby substantially increasing their probability that the system on the missile will be able to lock onto the target.

Current military aircraft are vulnerable to attack from surface-to-air and air-to-air missiles. Statistical data on aircraft losses in hostile actions since 1980 show that almost 90 percent of these losses have been the result of missile attacks. As a result, the ability to deploy decoys that can counter guidance systems on these missiles is of great value to protect aircraft during combat situations. To do this, the missile is deflected away by generating a signal that causes the radar guidance system in the missile to think that the target is actually elsewhere than it actually is.

As the complexity and cost of bodies deployed and towed from various aircraft increases, it becomes increasingly desirable to be able to retrieve them for reuse, while not losing the fast deployment capability that currently exists with non-retrievable deployment systems. The current invention retains the existing fast deployment capability while enabling retrieval and reuse.

The growth of fast deploy/retrievable technology requires a change in the maintenance philosophy of the system. This change requires that any mechanism used for the deployment, tow and retraction of the body be completely recoverable, ensuring that the body resume it's original pre-deployed state within it's housing. The existing approach of pyrotechnic launch and sever is no longer appropriate. The existing approach of an ejecting aft weather shield is no longer appropriate. The existing approach of blind mating connectors to facilitate rapid stores replacement is no longer worth the cost and reduced reliability.

The slow speed capability of some craft creates the need for a means of severing the towed body with little or no tension on the towline. The existing pyrotechnic approach becomes less reliable as the tension on the cable is decreased.

There are also existing devices employing spring loaded booms to help control the separation phase of deployment. However, none are known that use spring loaded fins to accomplish a share of the energy storage.

In one prior art method to fast deploy, a towed body uses a solenoid braking system. This process is not recoverable and no retrieval mechanism is available. Another prior art fast deploy launch approach uses a pyrotechnic. The existing sever approach uses a pyrotechnic. The existing weather protection approach uses an ejecting aft weather shield. These approaches are not recoverable and require service to the assembly before subsequent deployments. The existing connection approach uses blind mating connectors to facilitate rapid stores replacement. This approach is costly and unreliable and is no longer required.

BRIEF SUMMARY OF THE INVENTION

The system and apparatus of the present invention provides for the rapid deployment of a decoy from a moving object, such as an aircraft, which is connected to the aircraft by a towing cable preferably containing high voltage and fiber optic conductors to provide radar jamming signals to the decoy for disrupting the flight of a weapon, such as a missile, being guided to the aircraft by radar or other guidance signals.

Another aspect of the invention is to provide the system with an ejection device which rapidly deploys the decoy from its housing, which subsequently unwinds the cable from a spool containing a length of the towing cable by rotating an outer, generally cylindrical or cup-shaped bailer tube about the cable supply spool, and wherein the cable passes through a passage in the bailer tube and then through a cutter mechanism for severing the cable to detach the decoy from the aircraft should the need arise.

Another feature of the invention is to mount the cable supply spool in a non-rotational manner on a double helix rotatable shaft which reciprocates the spool along the shaft for removal of the cable from the spool, and wherein a DC motor is operatively connected to the rotatable shaft to control its rotational speed and consequently the payout speed of the cable from the spool reciprocally mounted on the shaft.

A further aspect of the invention is to provide a cutting mechanism containing a pair of solenoid actuated blades, one of which grips the cable to maintain tension thereon, while a second blade cuts the tensioned cable. This avoids problems occurring in prior severing systems wherein there is insufficient tension on the cable when the severing blade is engaged thereby eliminating the requirement for tension to be provided on the payload end of the system in order to efficiently sever the cable should the need arise after deployment of the decoy from the aircraft.

A further feature of the invention is to utilize a decoy with spring loaded fins biased to a fully extended position, which fins are engaged with the housing to assist in ejecting or deploying the decoy from the housing to increase the speed of deployment, and wherein the fins are automatically retractable into their loaded state upon the decoy being retrieved and restored in its storage housing beneath the aircraft.

Still another aspect of the invention is to provide one or more spring biased closure doors mounted on the discharge end of the storage housing which automatically close after the decoy has been retrieved to assist in keeping the decoy and components free of contaminants and harsh weather conditions, and in which the spring biased doors automatically open upon ejection of the decoy and boom from the storage housing.

A further aspect of the invention is to provide a locking mechanism which secures the cable payout bailer in a locked position upon the decoy reaching its extended position, and in which the lock remains engaged even should electric power be lost to the locking solenoid.

In further accordance with the invention, the energy stored in the springs which bias an extension boom to a deployment position in combination with the energy stored in the springs of the decoy fins, replace the energy heretofore obtained from pyrotechnic to rapidly deploy the decoy. Likewise, the towed body equipped with spring loaded fins which extend upon deployment, is augmented by the use of spring loaded boom to further eject the decoy and control its position throughout the separation phase of the deployment.

Furthermore, a DC motor is used to augment and control an optional centrifugal brake for the deployment of the decoy. A feedback and control system controls the speed of the deploying body by allowing it to fall away from the craft and accelerates it to the craft speed by matching separation speed to a predetermined velocity profile. This allows a fast deployment of the body without requiring the use of a transmission to disconnect the retrieval system and a separate braking control mechanism. A cable spool is locked by means of a fail safe pawl mechanism to tow the body without requiring a powered holding mechanism. Retrieval is accomplished by powering the DC motor to rewind the cable onto the spool. The device is fail safe such that in an unpowered condition the body will continue to be towed, and in the event of a failure of the spool lock actuator the body may still be retrieved.

The foregoing advantages, construction and operation of the present invention will become more readily apparent from the following description and the accompanying drawings.

BRIEF DESCRIPTION OF THE DRAWINGS

A preferred embodiment of the invention, illustrative of the best mode in which applicant contemplates applying the principles, is set forth in the following description and is shown in the drawings and is particularly and distinctly pointed out and set forth in the appended claims.

FIG. 1 is a diagrammatic view of an aircraft with a decoy being deployed therefrom;

FIG. 2 is a perspective view of the canister, which houses the decoy and deployment/retrieval mechanism therefor removed from the aircraft;

Similar numerals refer to similar parts throughout the drawings.

DETAILED DESCRIPTION OF THE INVENTION

FIG. 1 illustrates one type of aircraft indicated at 1, in which the improved payout and retrieval system and apparatus of the present invention can be utilized. The system includes a housing or canister 3, which can have a rectangular shape as shown in FIG. 2, or other configurations without affecting the invention. Housing 3 preferably is attached to and beneath the body of the aircraft. A decoy or other type of towed device or body indicated generally at 5, is connected to the deployment/retrieval apparatus by a cable 7. Decoy 5 can have various constructions, and preferably contains various electronic circuitries and apparatus which sends out various jamming signals to confuse the control signals supplied to an incoming missile intended to strike the aircraft. In order to provide decoy 5 with the desired radar or other missile control jamming signals, cable 7 will contain a source of voltage as well as fiber optics to supply various signals thereto. One example of cable 7 can be of a type described in pending patent application Ser. No. 60/428,156, filed Nov. 21, 2002, the contents of which are incorporated herein by reference.

Figure 3:
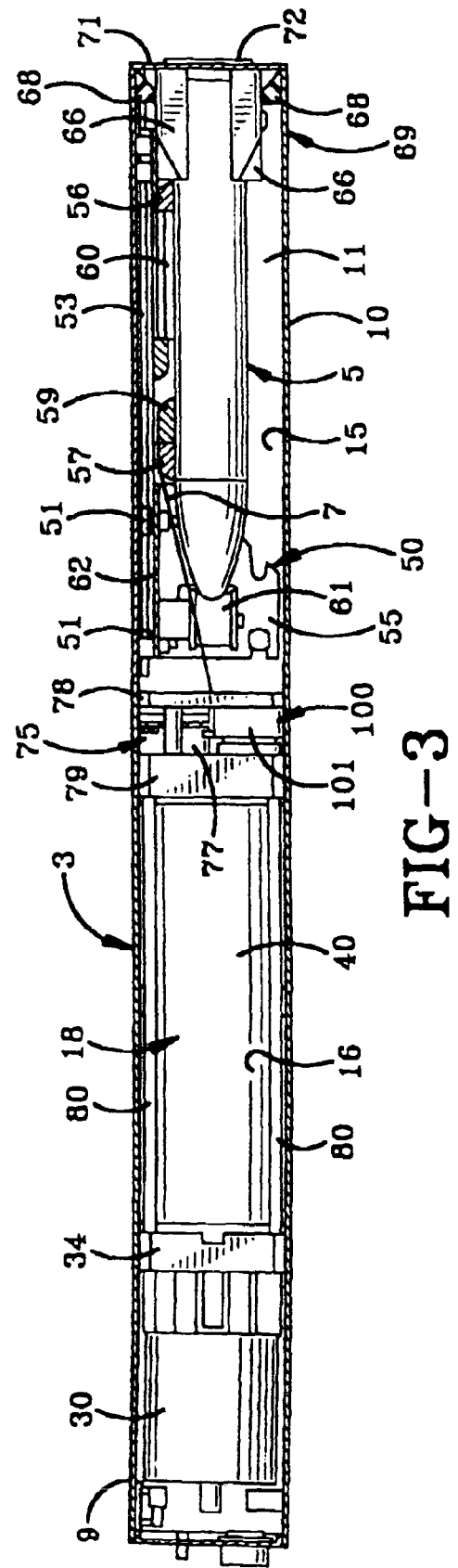
FIG. 3 is a diagrammatic sectional view of the decoy and deployment/retrieval mechanism therefor mounted within the canister, which is shown in section.

Housing 3 has top and bottom walls 9 and 10 and spaced side walls 11 and 12 which form a hollow interior 14. As shown in FIG. 3, interior 14 is divided into a forward decoy storage compartment 15, and an apparatus compartment or chamber 16.

Figures 4, 5:
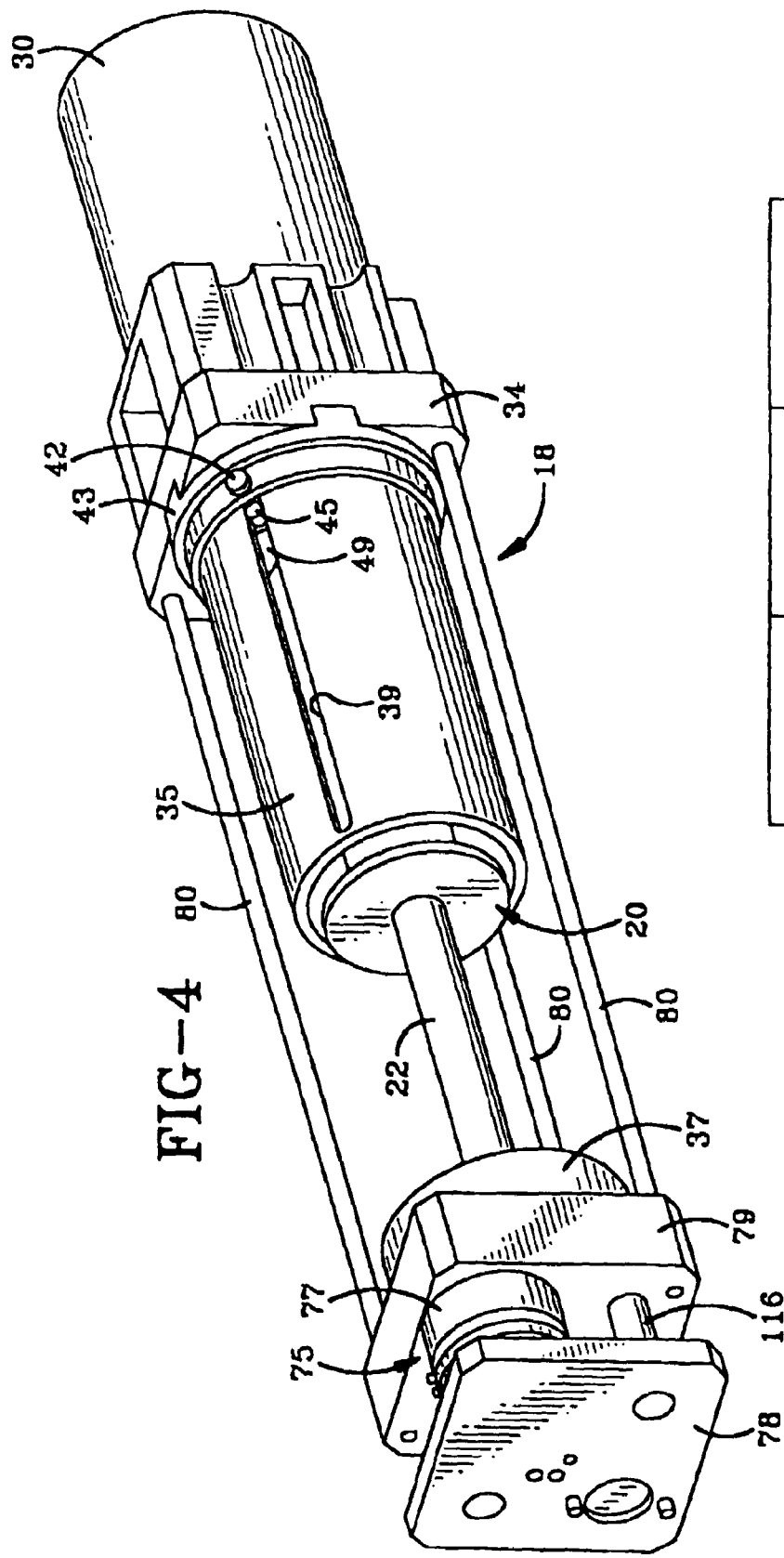
FIG. 4 is an enlarged diagrammatic view of the DC motor and cable bailer assembly removed from the canister of FIG. 3.
FIG. 5 is a block diagram of three enlarged fragmentary sectional views of the system components shown in FIG. 3.

In accordance with one of the features of the invention, a bailer mechanism indicated generally at 18 (FIGS. 4 and 5), is mounted within chamber 16. Bailer mechanism 18 includes a spool 20 which contains a supply length of cable 7 and which is mounted for oscillation along a helix shaft 22. Shaft 22 preferably is formed with a double helix, and is operatively connected to spool 20 by one or more pawls 23 which are engaged in helical grooves 24 of shaft 22. A main control shaft 26 is telescopically mounted within and extends through a hollow interior 27 of helix shaft 22 and is connected by a coupler 28 to a DC drive motor 30. Control shaft 26 is operatively connected to helix shaft 22 by a gear train indicated generally at 31 (FIG. 5A), so that rotation of shaft 26 by motor 30 will also rotate helix shaft 22, but at a slower speed than that of control shaft 26. Control shaft 26 is mounted by a rear bearing 33 in a fixed bulkhead 34, which is securely mounted within the interior of housing 3. The forward end of control shaft 26 (FIG. 5B) terminates in a squared end 36, which secures shaft 26 to a forward hub 37 so that hub 37 rotates with shaft 26. The forward end of helix shaft 22 is rotatably supported by a bearing 28 on forward hub 37.

An outer bailer tub 40 is mounted about control shaft 26, helix shaft 22, and spool 20, and is secured at its forward end to hub 37 by fasteners 41 (FIG. 5B) and at its rear end (FIG. 5A) by fasteners 42 to a collar 43, which is rotatably mounted by a bearing ring 44 on bulkhead 34. Thus, rotation of shaft 26 will rotate bailer tube 40, as well as rotating helix shaft 22, all of which in turn are connected directly to DC motor 30 through coupler 28. A plurality of cable guide rollers 46, 47, and 48 are mounted on bailer tube 40 or forward hub 37 to guide the cable from spool 20 through a solenoid locking mechanism and cutter mechanism described further below, for subsequent attachment to decoy 5.

An anti-rotation tube 35 is rigidly mounted at one end to bulkhead 34 (FIG. 5A) and extends about spool 20 and is formed with a plurality of longitudinally extending slots 39 into which pins 45 extend to prevent rotation of spool 20 and assist in its oscillating movement along helix shaft 22. Pins 45 are fixedly mounted in spool hub 49 and extend outwardly therefrom and into slots 39.

Figure 5A:
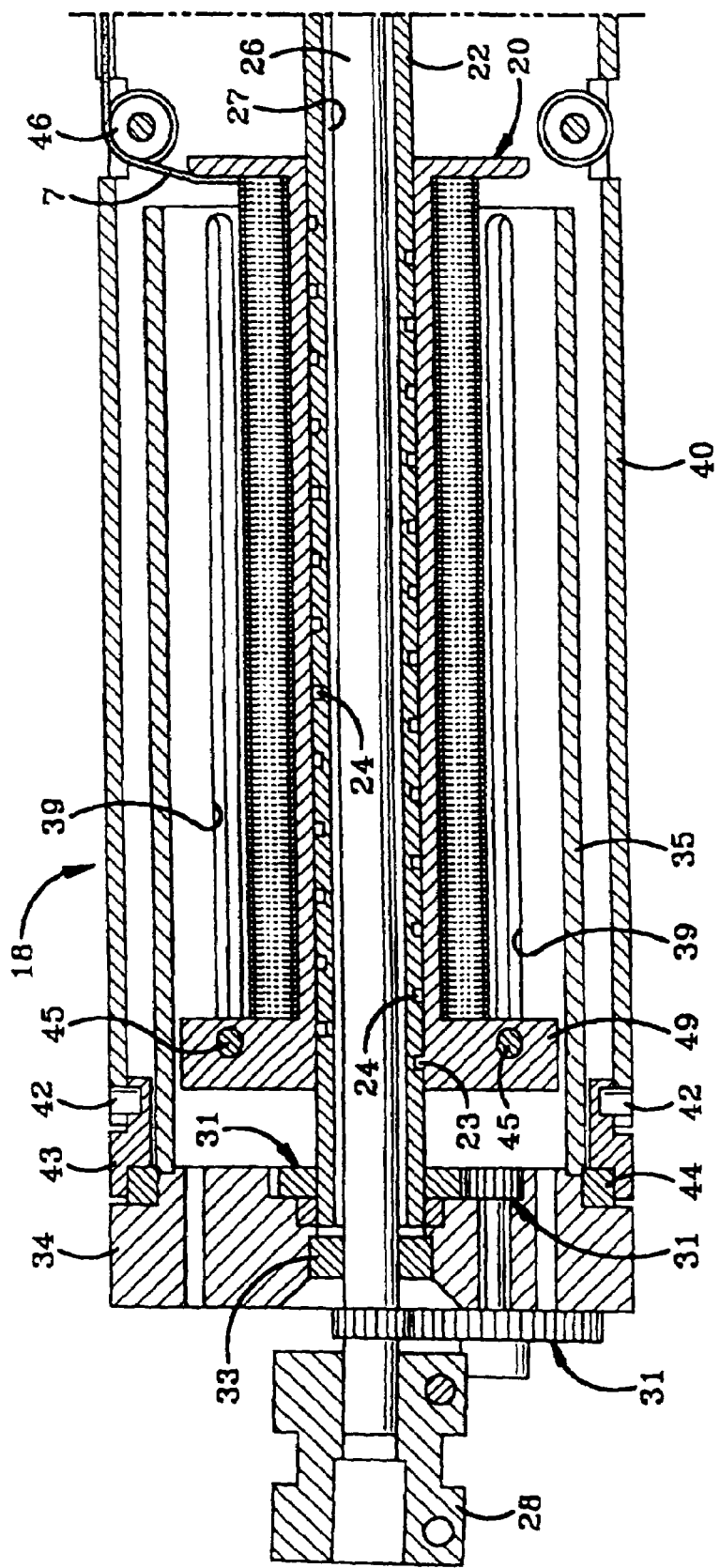
FIG. 5A is an enlarged fragmentary sectional view of the bailer assembly of the deployment/retrieval mechanism.
Figure 5B:
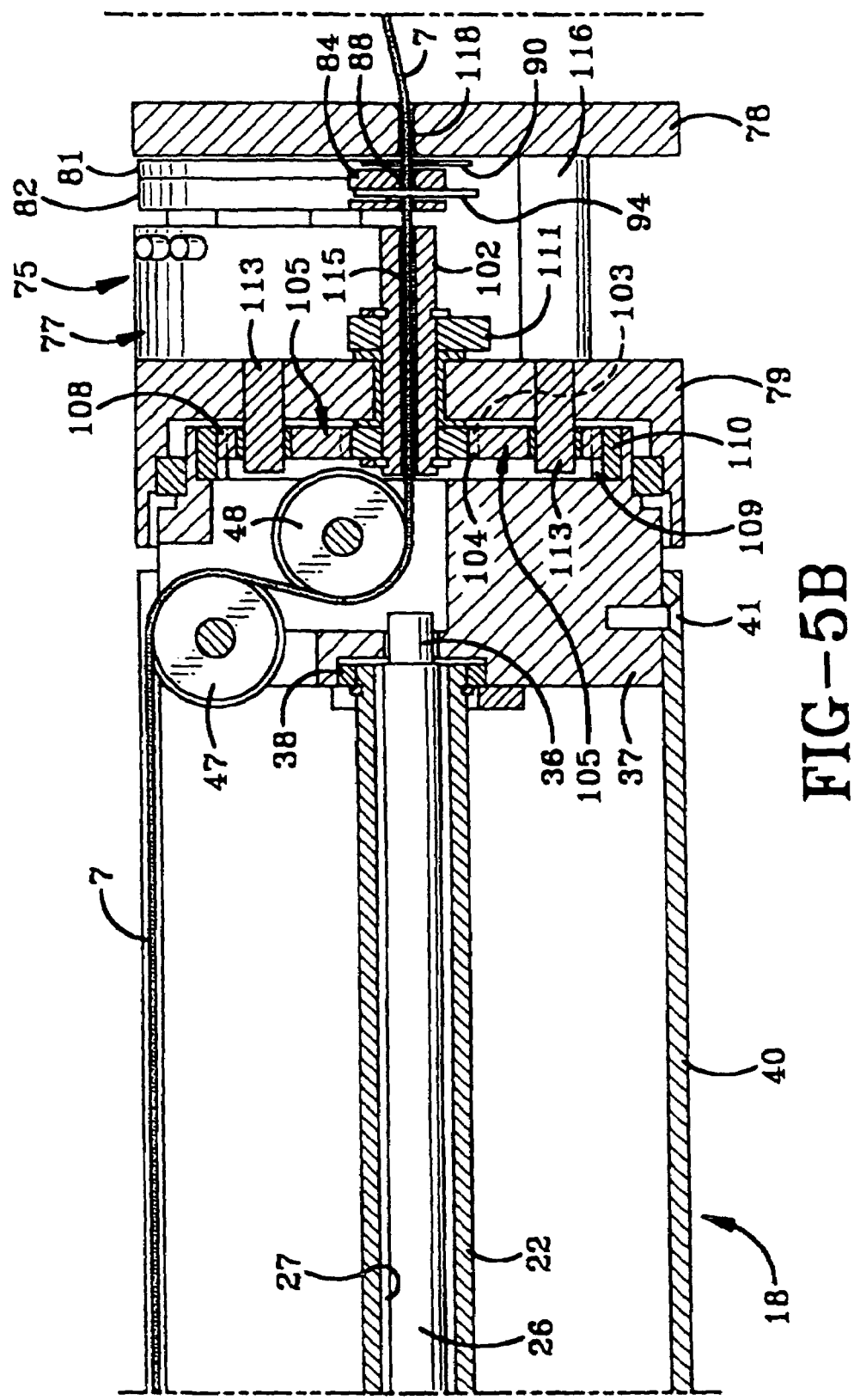
FIG. 5B is an enlarged fragmentary sectional view showing the towing cable cutter mechanism and bailer locking mechanism of FIG. 3.
Figure 12:
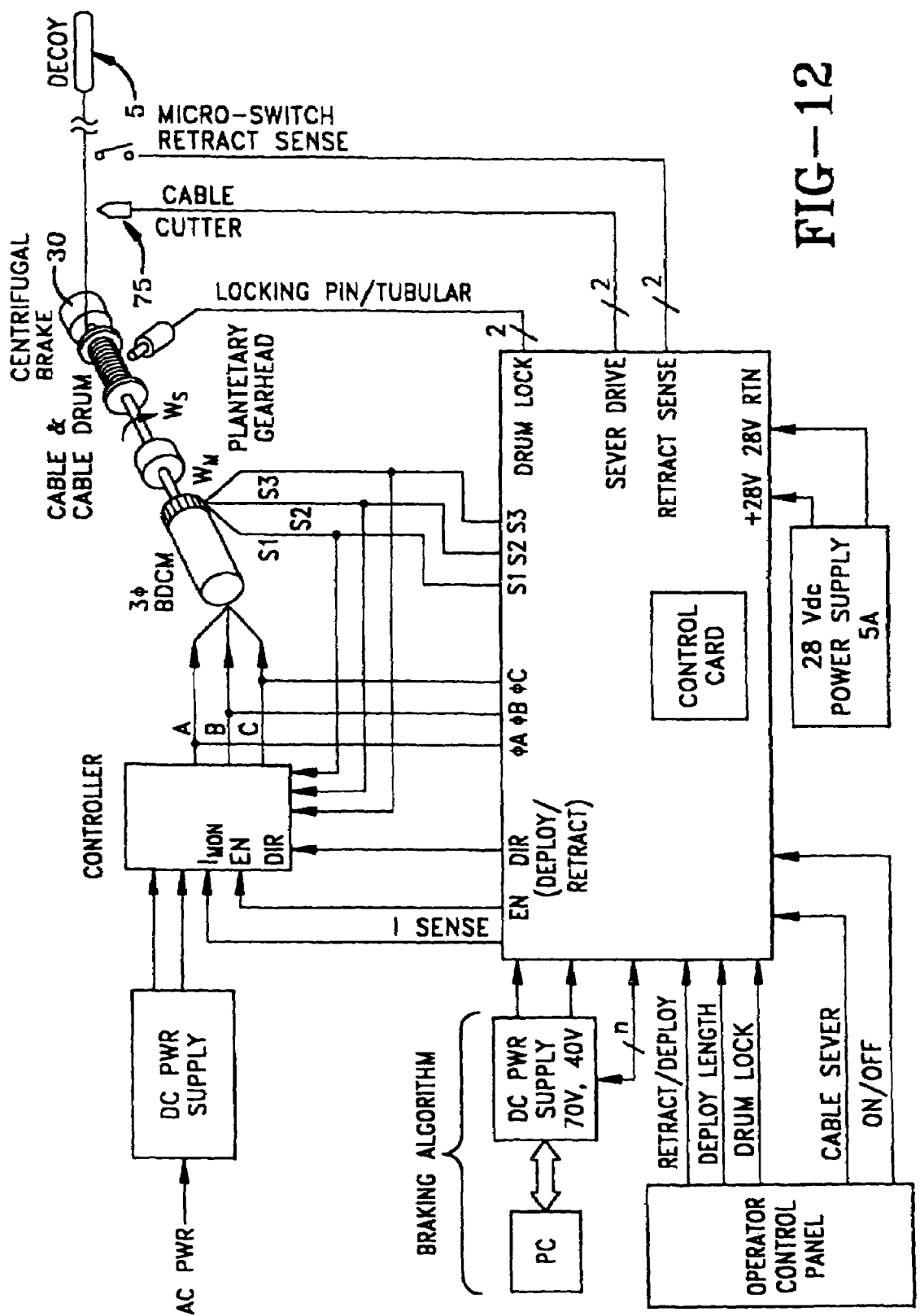
FIG. 12 is a schematic drawing of a feedback/control system used in a preferred embodiment of the method and apparatus of the present invention.

Referring to FIGS. 5A and 5B, when decoy 5 is deployed from housing 3 as discussed further below, tension is applied to cable 7 and will begin to unwind from spool 22, causing it to oscillate along helix shaft 22, which in turn will rotate control shaft 26 through gear train 31, which as shown in FIG. 12, will supply signals to the control circuitry which controls the speed of the deploying decoy. The control circuitry allows decoy 5 to fall away from the aircraft and accelerate to the aircraft's speed by matching separation speed to a predetermined velocity profile. This allows a fast deployment of the decoy without requiring the use of a transmission to disconnect the retrieval system in a separate braking control mechanism as described further below. U.S. Pat. No. 5,014,997 discloses one method of monitoring the velocity and total deployment distance of the ejected object for subsequent actuation of a braking mechanism upon the ejected body reaching the desired deployment speed and distance. The contents of U.S. Pat. No. 5,014,997 are incorporated herein by reference.

Figure 5C:
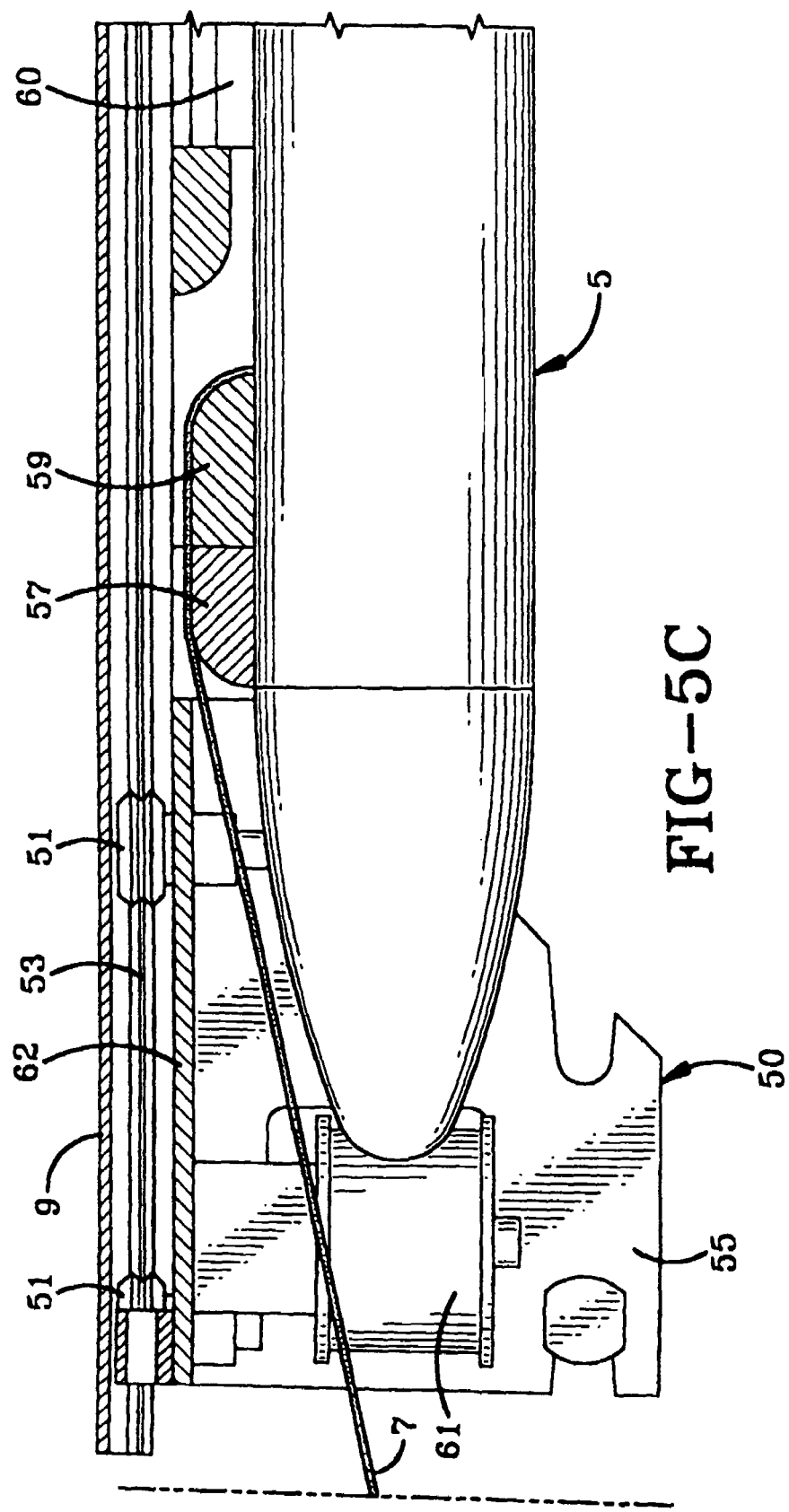
FIG. 5C is an enlarged fragmentary sectional view of a portion of the decoy and extendable boom of FIG. 3.
Figure 6:
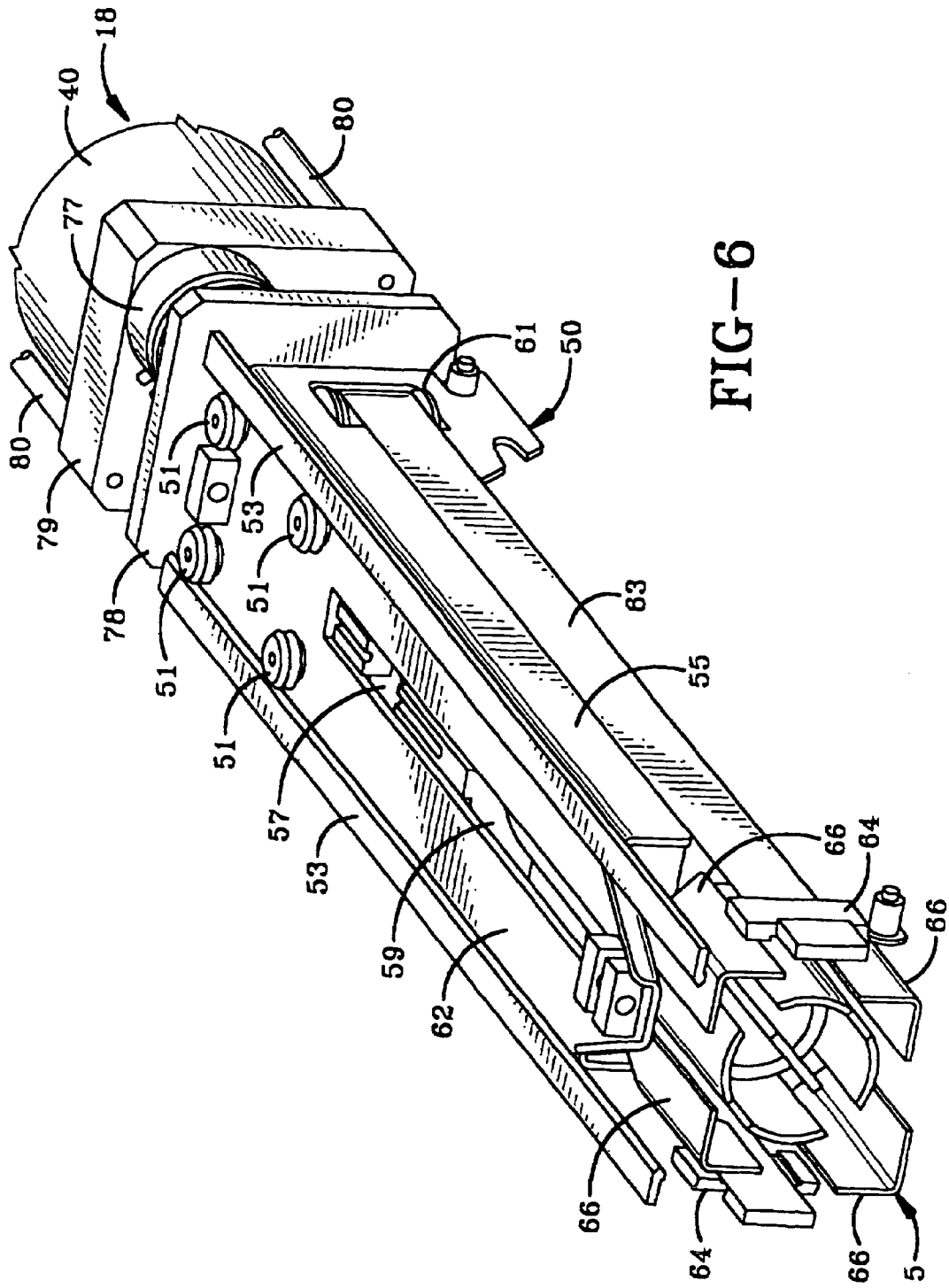
FIG. 6 is a fragmentary diagrammatic perspective view of the decoy mounted within the extendable boom of the deployment/retrieval mechanism with the boom in a retracted position.
Figure 7:
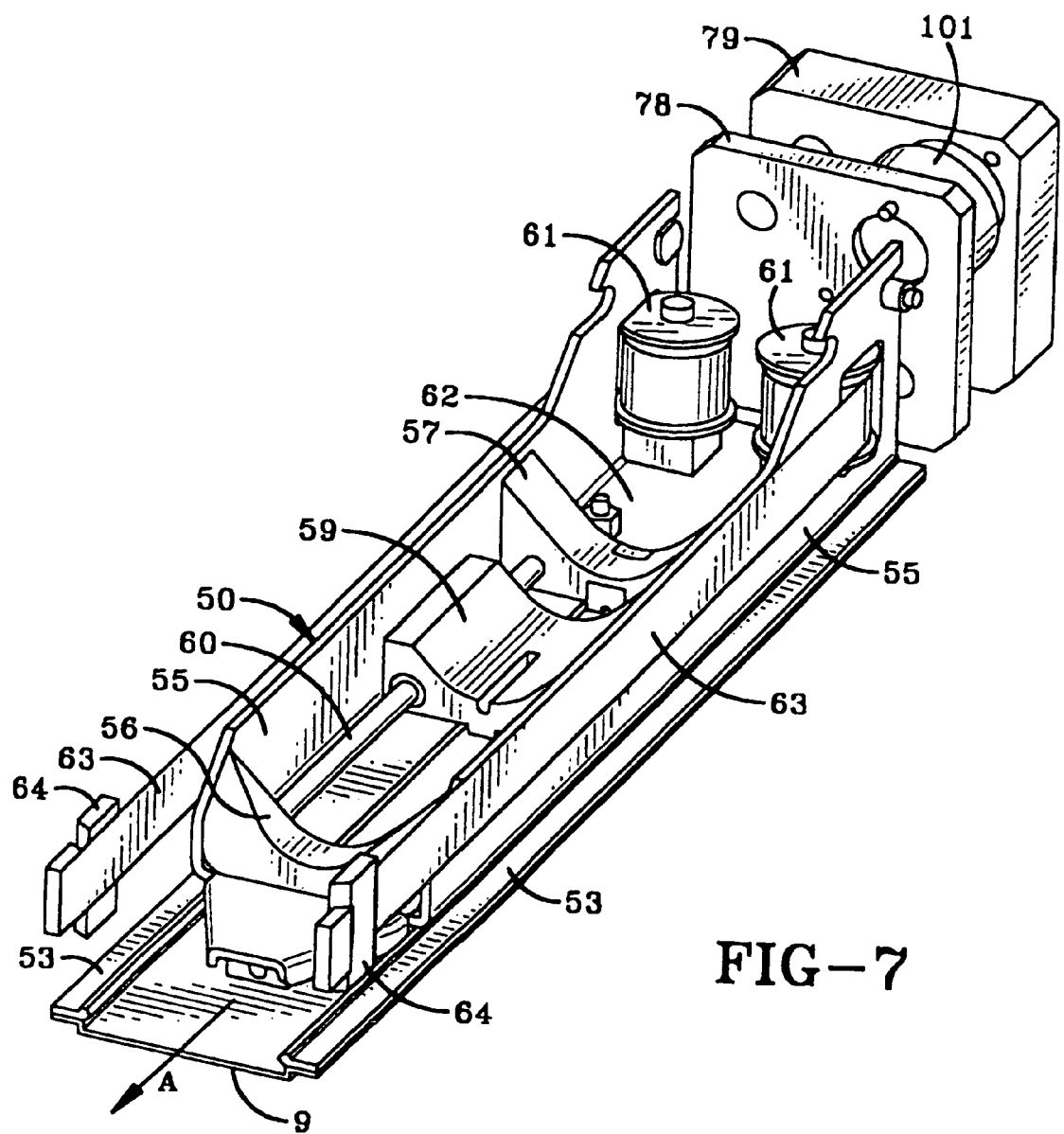
FIG. 7 is a diagrammatic perspective view showing a portion of the boom mechanism shown in FIG. 6, with the decoy being removed therefrom.

In accordance with another feature of the invention, the system of the present invention includes a unique deployment mechanism, shown particularly in FIGS. 5C-8. Decoy 5, when stored in housing 3 rests upon an extendable boom, which is indicated generally at 50. Boom 50 is moveably mounted in decoy storage compartment 15 (FIG. 3) and includes a plurality of guide rollers 51 (FIG. 6) which moveably suspend boom 50 on a pair of guide rails 53 which are attached to housing top wall 9. As shown in FIG. 7, boom 50 includes a pair of spaced side walls 55 and front and rear decoy rests 56 and 57 extending therebetween. An intermediate decoy capstan 59 is slidably mounted between front and rear decoy rests 56 and 57 by a pair of spaced slide rods 60. A pair of constant force coil springs 61 are mounted on a bottom wall 62 of boom 50 and a pair of deployment spring strips 63 extend along boom 50 and connect to a pair of posts 64 which are secured to the housing side walls 11 and 12 so that springs 61 bias boom 50 in an outward forward decoy deployment direction as shown by arrow A in FIG. 7. Thus, springs 61 bias boom 50 in the deployment direction of arrow A which supports decoy 5 in an at-rest retracted stored position within housing 3, ready for deployment upon a deployment signal being transmitted to the bailer locking solenoid as described further below.

Figure 8:
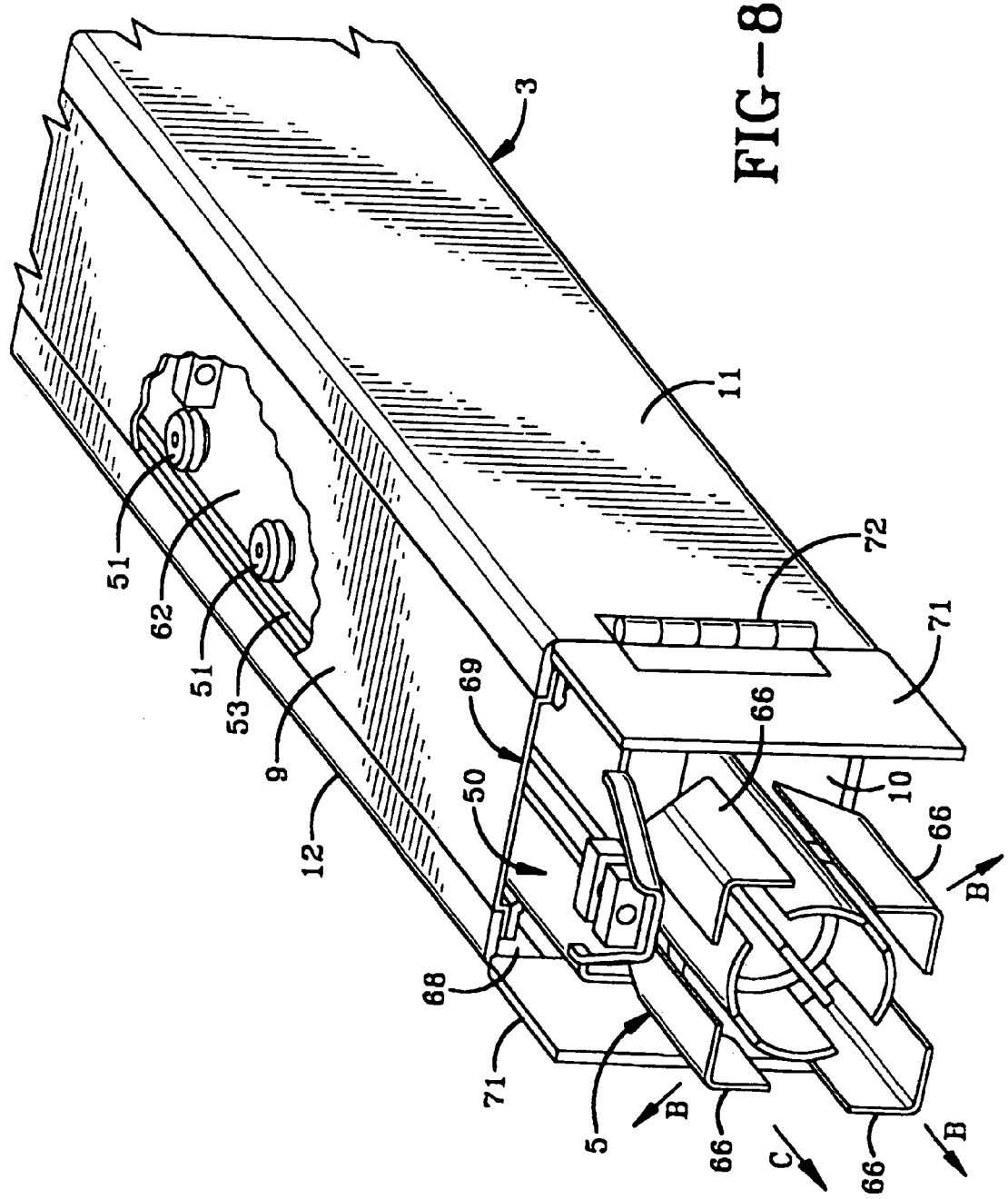
FIG. 8 is a fragmentary perspective view showing the discharge end of the canister with the decoy starting to be deployed from the open end thereof.

In further accordance with another feature of the invention, when decoy 5 is supported on extendable boom 50 and stored within housing 3, a plurality of decoy stabilizing fins 66 are in a retracted position as shown in FIGS. 6 and 8. Fins 66 are spring biased toward an outward extended position as shown by arrows B in FIG. 8, and when in the stored position, will engage ejection angled blocks 68, which are mounted on housing 3 adjacent an open discharge end 69. This relationship between spring biased fins 66 and blocks 68 further bias decoy 5 in the eject direction of arrow C, as shown in FIG. 8, in addition to the biasing force exerted thereon by springs 61.

In accordance with another feature of the invention, discharge end 69 of housing 3 is closed by a pair of closure doors 71 which are spring biased by springs 72 toward a closed position as shown in FIG. 3. Doors 71 protect decoy 5, including the associated components and electronic connections, etc. from exposure to the harsh surrounding atmosphere and weather which will be encountered when mounted beneath aircraft 1. Two such closure doors 71 are shown in FIG. 8, which when in the closed position, form a complete closure for end opening 69. Doors 71 are opened automatically to a position as shown in FIG. 8, upon boom 50 moving outwardly from housing 3 by the action of ejection springs 61 and spring biased fins 66.

In accordance with still another feature of the invention, a cutter mechanism indicated generally at 75, is mounted within housing 3, between decoy storage compartment 15 and bailer compartment 16, for severing cable 7 should the need arise after the decoy has been deployed. Although the present invention contemplates the retrieval of decoy 5 back into housing 3, certain situations can arise after it has been deployed, where it becomes necessary to detach the decoy from the towing aircraft by severing cable 7. Heretofore, pyrotechnics was utilized to sever the cable, which has various drawbacks.

Figure 11:
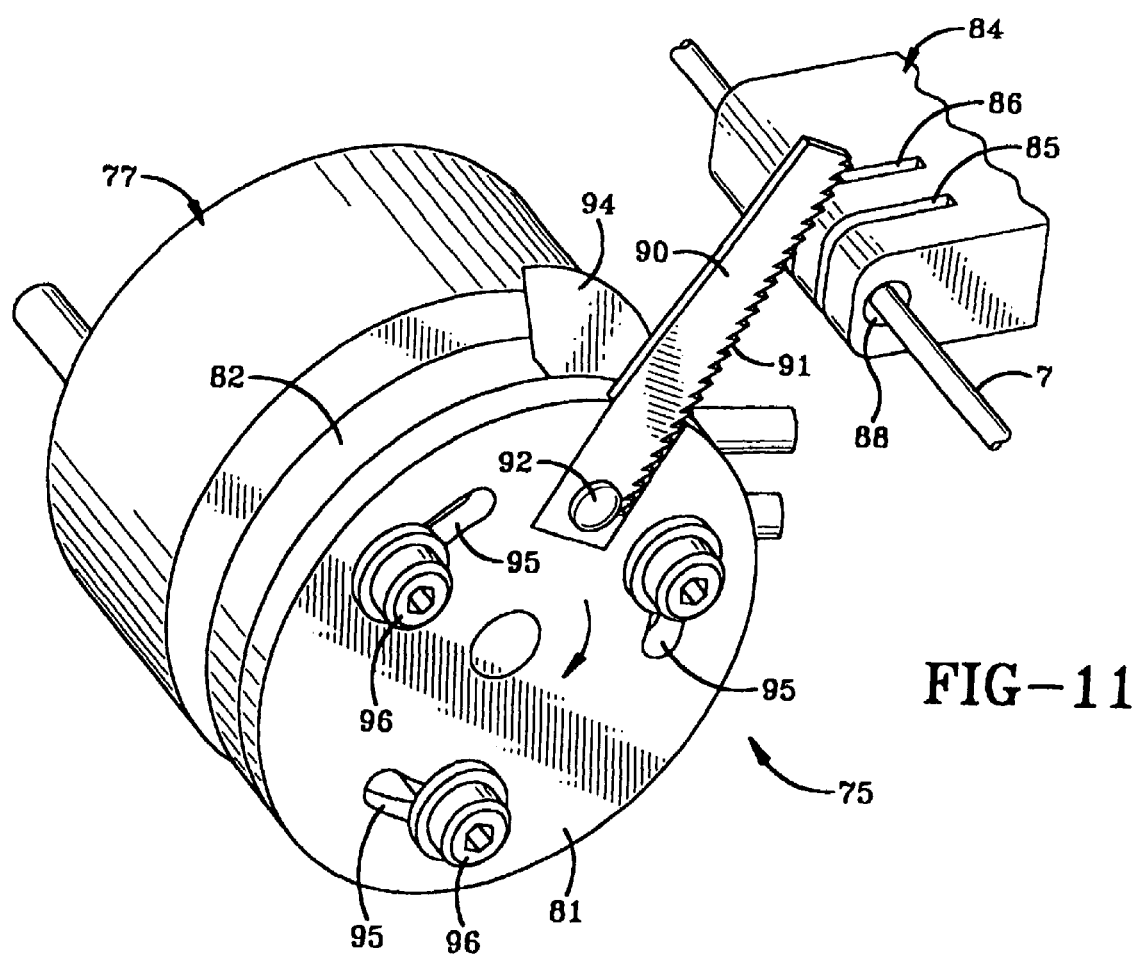
FIG. 11 is an enlarged diagrammatic perspective view of the cutter mechanism and adjacent towing cable removed from the deployment/retrieval mechanism.

Cutter mechanism 75 includes an electric actuated rotary solenoid 77 which is mounted between a front solenoid mounting plate 78 and a rear solenoid lock plate 79. Lock plate 79 is rigidly mounted within housing 3 and is connected to bulkhead 34 by a plurality of stabilizing rods 80 (FIG. 5) extending therebetween. Solenoid 77 (FIG. 11) includes a pair of rotatable disks, including a front grabber disk 81 and a spaced rear cutter disk 82. Solenoid 77 is located adjacent a cable guide bracket 84 which is formed with a pair of slots 85 and 86. Cable 7 moves through a passage 88 formed in bracket 84 and through slots 85 and 86. A grabber blade 90, having a saw tooth edge 91, is mounted by a fastener 92 on disk 81 and extends outwardly therefrom, and is adapted to move into slot 85 of bracket 84 to grip cable 7 therein. A cutter blade 94 is attached to and extends outwardly from cutter disk 82 and moves into guide bracket slot 86 upon solenoid 77 being actuated. Should the necessity arise for severing cable 7, solenoid 77 is actuated which rotates disks 81 and 82 in a clockwise direction as shown in FIG. 11, bringing saw tooth edge 91 into gripping engagement with cable 7 which will maintain tension on cable 7 until blade 94 moves into slot 86 to sever the cable.

Heretofore, if a blade, whether actuated by pyrotechnics or other type of force, engages cable 7, the cable may not have sufficient tension thereon to enable the blade to completely sever the cable, depending upon the particular position of the decoy at the time the blade is moved into severing engagement with the cable. However, by first gripping cable 7 with blade 90, it maintains the cable under tension regardless of the position of the decoy, enabling blade 94, which follows immediately after blade 90 grips cable 7, to completely sever the cable. A torsional spring (not shown) is located between disks 81 and 82 to bias disk 81 and blade 90 in the clockwise direction so that blade 90 maintains a gripping engagement with cable 7 as cutter blade 82 rotates into cutting engagement with the cable. A plurality of arcuate slots 95 preferably are formed in grabber disk 81 and have stop pins 96 extending therethrough. This maintains grabber disk 81 in its forward-most gripping position after solenoid 77 is energized and the torsional spring continues to bias disk 81 in this grabbing direction.

Figure 9:
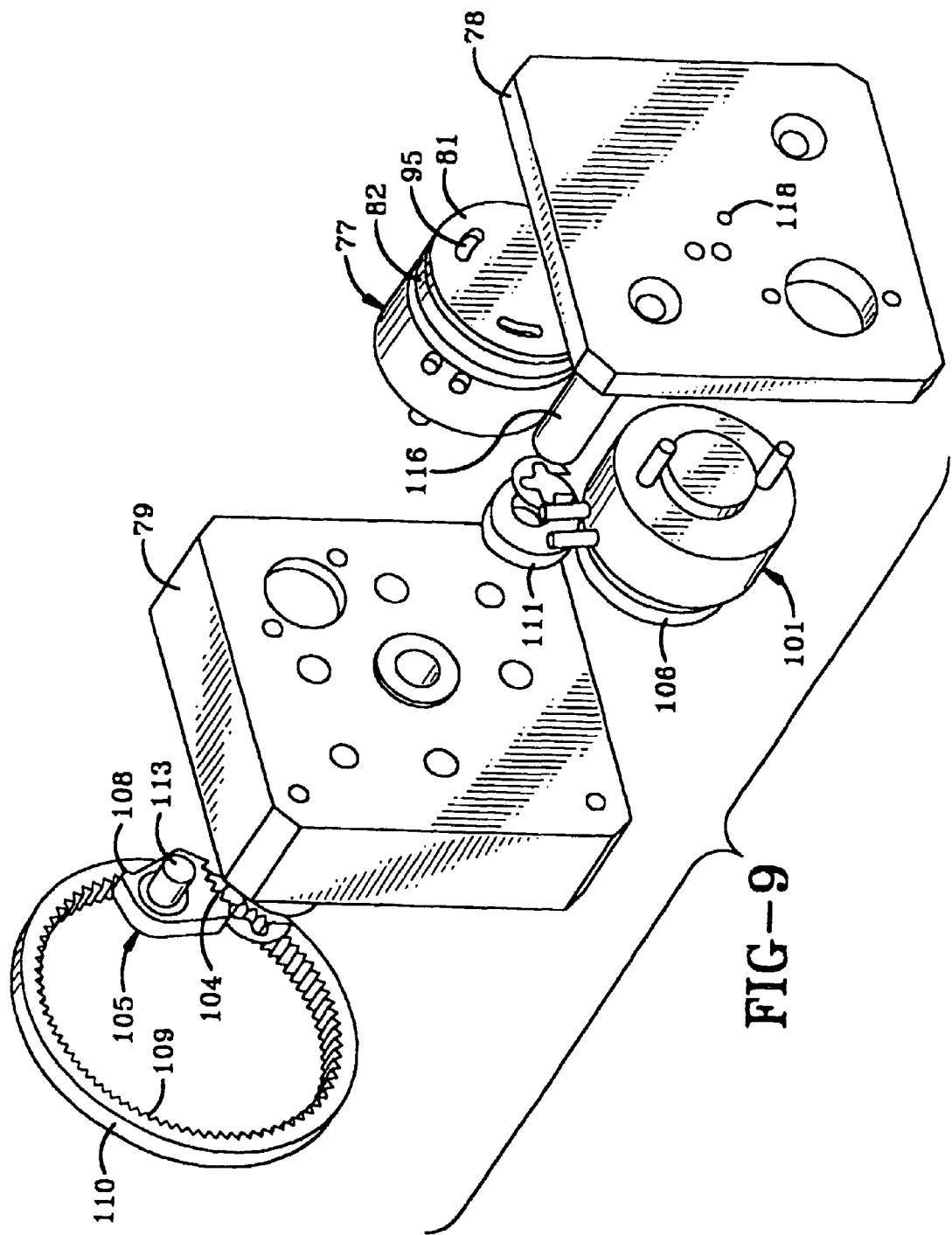
FIG. 9 is an enlarged diagrammatic exploded perspective view showing the bailer locking mechanism and cutter mechanism.
Figure 10:
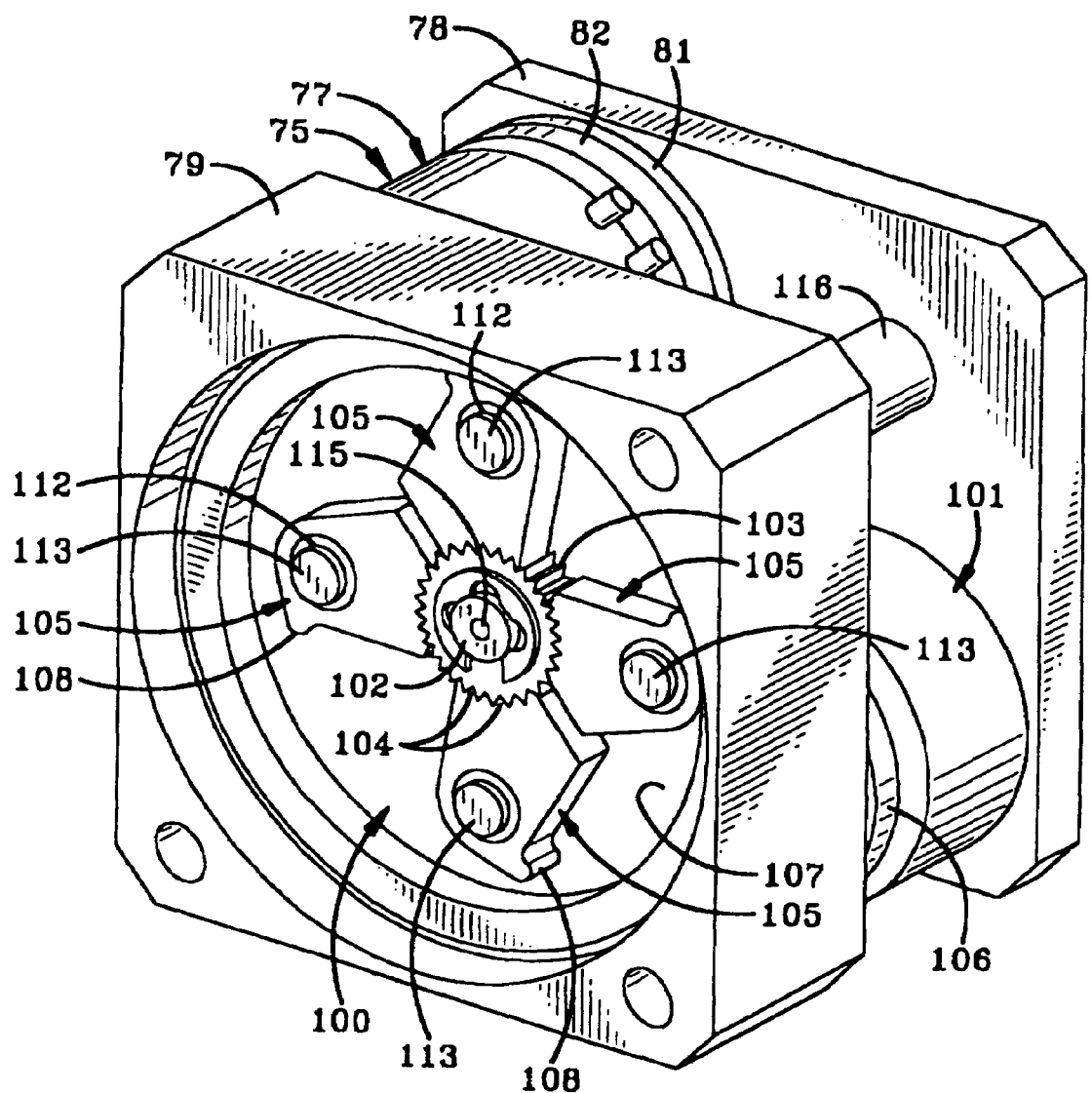
FIG. 10 is an enlarged perspective view of the bailer locking mechanism.

In accordance with still another feature of the invention, a bailer lockout mechanism indicated generally at 100, is provided to lock bailer mechanism 18 in a fixed non-rotatable condition after the decoy has been deployed to its desired length. Bailer lockout mechanism 100 is best shown in FIGS. 9 and 10, and includes a rotary solenoid 101, which is mounted in an offset relationship between plates 78 and 79. Solenoid 101 includes a rotatable disk 106 which drivingly engages a rotatably mounted cam or gear 111, which in turn rotates a shaft 102 which is rotatably mounted in and extends through plate 79. Shaft 102 which is provided with gear teeth 103 (FIG. 5B), which matingly engage complementary gear teeth 104 formed on the inner end of a plurality of cams 105. Cams 105 extend radially outwardly with respect to shaft 102, and are located within an annular recess 107 formed in the rear of plate 79. The outer ends of cams 105 are formed with a tooth 108 which is adapted to matingly engage gear teeth 109 formed in a control ring 110 (FIG. 9) which extends into recess 107 and is fixedly connected to forward hub 37 of bailer mechanism 18 as shown in FIG. 5B. The extended ends of cams 105 are formed with holes 112 through which pins 113 extend to pivotally mount cams 105 on plate 79. Thus, as best shown in FIG. 10, upon actuation of solenoid 101, rotation of shaft 102 will pivot cams 105, moving teeth 108 into engagement with gear teeth 109 of control ring 110, coupling the solenoid and in particular, cams 105, with bailer mechanism 18. Thus, when teeth 108 are engaged with teeth 109 of control ring 110, it will prevent the rotation of bailer tube 40 which is attached to ring 110, and correspondingly prevent the further deployment of cable 7 from spool 20. Thus, upon the control circuitry of FIG. 12 and as discussed in U.S. Pat. No. 5,014,997, detecting that the decoy has reached the desired extended position, lock solenoid 101 is actuated by de-energizing the solenoid, which will rotate lock teeth 108 into engagement with control ring 110 to prevent any further rotation of bailer tube 40.

Solenoid shaft 102 is formed with a central hole 115 through which cable 7 extends for connecting the cable to decoy 5 as shown in FIGS. 5B and 5C. A plurality of posts 116 extend between spaced plates 78 and 79 to provide the desired spacing and stability thereto. Front plate 78 is formed with a central hole 118, which aligns with hole 115 formed in solenoid shaft 102, to permit the passage of cable 7 therethrough. When decoy 5 is at rest within housing 3 and supported on extendable boom 50, cable 7 is under sufficient tension to maintain the decoy in housing 3, in which position outer doors 71 will be closed. In this position, bailer locking mechanism 100 is engaged, preventing the rotation of bailer tube 40, and thus maintaining the desired tension on cable 7.

When in an at rest position, decoy 5 is retained within storage compartment 15 by cable 7 which is wrapped about spool 20 and which is in a locked position by bailer lockout mechanism 100 as discussed above. Upon the appropriate signal being supplied to lockout mechanism 100, solenoid 101 is energized which rotates shaft 102 in a counterclockwise direction (FIG. 10) to disengage teeth 108 from control ring teeth 109. Torsional springs 61 and spring biased fins 66 will immediately move boom 50 and supported decoy 5 forwardly in the direction of arrow C (FIG. 8) to eject decoy 5 from housing 3. The unique combination of coil springs 61 and spring biased fins 66 increases the ejection speed of the decoy from the housing without the use of pyrotechnics. Cable 7 will continue to unwind from spool 20 by oscillating along helix shaft 22 as bailer tube 40 rotates, with cable 7 moving along and in between rollers 46, 47, and 48 and through rotary solenoid shaft hole 102 of the bailer lockout mechanism, and through cable passage 88 formed in guide bracket 84. Decoy 5 continues to be deployed until the desired speed and length of cable 7 has been reached, as discussed above, whereupon appropriate signals are forwarded to DC motor 30. Motor 30 is energized and provides a reverse or braking effect to the motor shaft and correspondingly, to main drive shaft 26 (FIG. 5A). Shaft 26 in turn, slows the rotation of helix shaft 22 through gear train 31, and correspondingly slows the reciprocal movement of spool 20 therealong. After DC motor 30 has stopped the rotation of shafts 26 and 22 and the movement of the spool 20 preventing further payout of cable 7 therefrom, bailer lockout mechanism 100 is actuated and in particular, rotary solenoid 101, which moves pawl teeth 108 into locking engagement with teeth 109 of control ring 110 which is fixed to bailer tube 40, preventing any further rotation of the bailer assembly. As discussed above, should the need arise, cutter mechanism 75 can be actuated to sever the cable to release decoy 5 from being towed by aircraft 1.

However, in most situations, it is desired to retrieve decoy 5 back into housing 3 ready for redeployment. This is accomplished easily by energizing rotary solenoid 101 of bailer lockout mechanism 100, and energizing DC motor 30 to rotate control shaft 26 in an opposite direction from that of the deployment direction, which in turn will rotate helix shaft 22 and oscillate spool 20 therealong to wind cable 7 about the spool, bringing decoy 5 back into position on decoy rests 56 and 57 and decoy capstan 59 of extended boom 50. After decoy 5 has come to rest on extendable boom 50, continued tension on cable 7 will move the extended boom back into housing 3 by decoy 5 being drawn further into the housing. Retraction of boom 50 will rewind spring strips 63 within torsional springs 61 so that the springs are ready again to extend boom 50 should the need arise. After boom 50 is retracted, closure doors 71 are automatically pivoted to a closed position by springs 72, sealing the end of housing 3 from contaminants. Fins 66 will fold in automatically upon entering housing 3, and will engage angled blocks 68 so that they are also in a biasing position, attempting to eject decoy 5 from housing 3. Thus, decoy 5 is in position for subsequent deployment should the need arise without requiring any further maintenance or reloading as in prior deployment systems. As shown in FIG. 5A, the retraction force which is exerted by control shaft 26 is coupled directly to the motor, which provides both the retraction force for retrieving decoy 5, as well as the dynamic braking as the decoy is being deployed from housing 3.

There are existing devices employing spring loaded booms to help control the separation phase of deployment. However, none of these devices are known to use spring loaded fins to provide a share of the energy storage. Also, there is no known apparatus which provides for the fast deploy, towed body assembly that uses spring loaded weather doors, zero tension cutter functionality as that of the present invention. The present invention also provides a cutter assembly that uses a holding mechanism to insert zero tension cutter functionality, and provides for severing a towed body with zero tension on the towline.

Also, as best shown in FIG. 3, the present invention provides a deployment/retrieval system and apparatus wherein the deployment and retrieval apparatus are in alignment with the decoy instead of being in a stacked relationship as in prior systems. This provides for a more streamlined and compact housing, as shown in FIG. 2, for mounting on an aircraft.

The method of the present invention also provides for a controlled fast deployment, tow and retrieval of a towed body behind a craft without the use of a transmission to disengage the retrieval mechanism or separate brake mechanism. The device is fail safe such that in an unpowered condition the body will continue to be towed, and in the event of a failure of the spool lock actuator the body may still be retrieved.

The method of the present invention also provides all the required functionality in completely recoverable form. Each function operates on deployment in one direction and reverses on retraction such that the initial conditions for subsequent launches is the same as for the initial launch.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A cutter mechanism for severing a towing cable extending between a towing vehicle and a towed object, said cutter mechanism comprising:
    an electric operated solenoid;
    a guide block formed with a passage for receiving a portion of the towing cable therein;
    a gripper blade adapted to be brought into gripping engagement with the portion of the cable in the guide block passage upon actuation of said solenoid; and
    a moveable cutter blade mounted on the solenoid and spaced axially from the gripper blade and adapted to be brought into cutting engagement with the portion of the cable in the guide block upon actuation of the solenoid while the cable is being gripped by the gripper blade to sever said cable and wherein the cutter blade is adapted to be located between the gripper blade and towing vehicle.

2. The cutter mechanism defined in claim 1 wherein the gripper blade has a saw tooth edge to grip the cable.

3. The cutter mechanism defined in claim 1 wherein the gripper blade is spring biased and is mounted on a first plate and extends outwardly therefrom; and in which said plate is rotatably mounted on the solenoid and biased toward gripping engagement with the cable by a torsional spring.

4. A cutter mechanism for severing a towing cable extending between a towing vehicle and a towed object, said cutter mechanism comprising:
    an electric operated solenoid;
    a spring biased gripper blade mounted on a first plate and extending outwardly therefrom, said plate being rotatably mounted on the solenoid and biased toward gripping engagement with the cable by a torsional spring and adapted to be brought into gripping engagement with the cable upon actuation of said solenoid; and
    a cutter blade mounted on the solenoid adapted to be brought into cutting engagement with the cable upon actuation of the solenoid while the cable is being gripped by the gripper blade to sever said cable.

5. The cutter mechanism defined in claim 4 wherein the first plate is disc-shaped and is formed with a plurality of arcuate slots; and in which stop pins extend through said slots to limit the rotational movement of said first plate when the gripper blade is brought into gripping engagement with the cable.

6. A method of severing a towing cable extending between a towing vehicle and a towed object, including the steps of:
    providing a cutter mechanism having a gripper blade and a cutting blade and a source of power for moving said blades into contact with the towing cable;
    moving the gripper blade into gripping contact with the cable outboard of the power source to maintain tension on said cable; and then
    moving the cutting blade into engagement with the cable to sever the cable while the gripper blade maintains gripping engagement with said cable.

7. The method defined in claim 6 including the steps of passing the towing cable through a guide block; and moving the gripper blade and cutter blade through slots formed in the guide block for gripping and then severing the cable, respectively.

8. The cutter mechanism defined in claim 4 wherein the cutter blade is mounted on a second plate and extends outwardly therefrom; and in which said plate is rotatably mounted on the solenoid between said first plate and the solenoid.

9. The cutter mechanism defined in claim 1 wherein the guide block is formed with a pair of slots which communicate with the passage; and in which the gripper blade and cutter blade each extend through a respective one of said slots when gripping and cutting respectively the portion of the cable.

* * * * *